United States Patent
Yang et al.

(10) Patent No.: US 6,275,630 B1
(45) Date of Patent: *Aug. 14, 2001

(54) COMPACT DOUBLE-PASS WAVELENGTH MULTIPLEXER-DEMULTIPLEXER

(75) Inventors: Wei Yang, Fremont, CA (US); Shu Zhang, Waterloo (CA)

(73) Assignee: BaySpec, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,289

(22) Filed: Nov. 17, 1998

(51) Int. Cl.[7] ........................................ G02B 6/34
(52) U.S. Cl. .............................. 385/37; 385/24; 385/35; 359/130; 359/131
(58) Field of Search ................................. 385/14, 24, 37, 385/31, 33, 34, 35; 359/129, 130, 131, 132, 124

(56) References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.17 |
| 4,198,117 | 4/1980 | Kobayashi | 350/96.19 |
| 4,274,706 | 6/1981 | Tangonan | 350/96.19 |
| 4,299,488 | 11/1981 | Tomlinson, III | 356/328 |
| 4,337,993 | * 7/1982 | Kompfner . | |
| 4,359,259 | 11/1982 | Horner et al. | 350/3.7 |
| 4,387,955 | 6/1983 | Ludman et al. | 350/96.19 |
| 4,522,462 | 6/1985 | Large et al. | 350/96.19 |
| 4,583,820 | * 4/1986 | Flamand et al. . | |
| 4,622,662 | 11/1986 | Laude et al. | 370/3 |
| 4,634,215 | 1/1987 | Reule | 350/96.19 |
| 4,643,519 | 2/1987 | Bussard et al. | 350/96.19 |
| 4,671,607 | 6/1987 | Laude | 350/96.15 |

(List continued on next page.)

OTHER PUBLICATIONS

Tomlinson, W.J., "Wavelength Multiplexing In Multimode Optical Fibers", *Applied Opticsl*, vol. 16, No. 8, pp. 2180–2194 (Aug. 1997).

Chang, B.J. et al., "Dichromated Gelatin For The Fabrication of Holographic Optical Element", *Applied Optics*, vol. 18, pp. 2407–2417 (1979).

(List continued on next page.)

*Primary Examiner*—Hemang Sanghavi
(74) *Attorney, Agent, or Firm*—Justin Boyce; Tamiz Khan; Oppenheimer Wolff & Donnelly LLP

(57) ABSTRACT

An optical multiplexing and demultiplexing device including a fiber mounting assembly for aligning optical fibers, a set of collimating and focusing optics, a transmission grating element, and a mirror element. The fiber mounting assembly alignment element aligns a series substantially close-spaced optical fibers with their ends flush and assembled in a substantially straight line. The optical fibers are either multimode or single mode communication fibers capable of transmitting optical wavelengths with substantially high transmittance. The set of collimating and focusing optics, preferably a lens (or mirror) system that contains two (2) or more elements, may be made from optical glasses with uniform refractive indices, optical glasses with gradient indices, plastic optical elements, or diffractive lenses. The transmission grating element can be made from holographic techniques utilizing photosensitive media, where the media having sufficient thickness to provide high diffractive efficiency and wide operation waveband. The photosensitive media providing high spatial resolution in order to generate high groove density—thus high spectral resolution for DWDM applications. The mirror element, having a high reflectance coating for the wavelengths of interest, is arranged at such an angle that the optical radiation will be reflected back to the grating. It will then be diffracted again by the grating then focused to the optical fibers.

27 Claims, 7 Drawing Sheets

U.S. PATENT DOCUMENTS

| | | | |
|---|---|---|---|
| 4,675,860 | 6/1987 | Laude et al. ............................ 370/3 |
| 4,703,472 | 10/1987 | Blumentritt et al. .................... 370/3 |
| 4,708,425 | 11/1987 | Gouali et al. ....................... 350/96.16 |
| 4,726,645 | 2/1988 | Yamashita et al. ............... 350/96.18 |
| 4,740,951 | 4/1988 | Lizet et al. ................................ 370/3 |
| 4,741,588 | 5/1988 | Nicia et al. ........................ 350/96.19 |
| 4,744,618 | 5/1988 | Mahlein ............................ 350/96.19 |
| 4,746,186 | 5/1988 | Nicia ................................. 350/96.13 |
| 4,763,969 | 8/1988 | Khoe et al. ........................ 350/96.19 |
| 4,773,063 | 9/1988 | Hunsperger et al. ..................... 370/3 |
| 4,786,133 | 11/1988 | Gidon et al. ....................... 350/96.19 |
| 4,819,224 | 4/1989 | Laude et al. .............................. 370/3 |
| 4,819,244 | 4/1989 | Yamamoto et al. .................... 372/46 |
| 4,824,193 * | 4/1989 | Maeda et al. . |
| 4,836,634 | 6/1989 | Laude ................................ 350/96.19 |
| 4,923,271 | 5/1990 | Henry et al. ....................... 350/96.19 |
| 4,926,412 | 5/1990 | Jannson et al. ........................... 370/3 |
| 4,930,855 | 6/1990 | Clark et al. ........................ 350/96.19 |
| 5,026,131 | 6/1991 | Jannson et al. ........................ 350/3.7 |
| 5,107,259 | 4/1992 | Ohuchida ............................. 359/124 |
| 5,119,454 | 6/1992 | McMahon .............................. 385/49 |
| 5,305,402 * | 4/1994 | Hill et al. ................................. 385/25 |
| 5,355,237 | 10/1994 | Lang et al. ............................ 359/130 |
| 5,363,220 | 11/1994 | Kuwayama et al. ..................... 359/3 |
| 5,371,813 | 12/1994 | Aartgue .................................. 385/24 |
| 5,440,416 | 8/1995 | Cohen et al. ......................... 359/127 |
| 5,442,472 | 8/1995 | Skrobko ............................... 359/110 |
| 5,450,510 | 9/1995 | Boord et al. ............................ 385/37 |
| 5,457,573 | 10/1995 | Iida et al. .............................. 359/569 |
| 5,500,910 | 3/1996 | Boudreau et al. ...................... 385/24 |
| 5,526,155 | 6/1996 | Knox et al. ........................... 359/130 |
| 5,555,334 | 9/1996 | Ohnishi et al. ....................... 385/558 |
| 5,581,639 * | 12/1996 | Davies et al. ........................... 385/37 |
| 5,583,683 | 12/1996 | Scobey ................................. 359/127 |
| 5,768,450 | 6/1998 | Bhagavatula ........................... 385/24 |
| 5,777,763 | 7/1998 | Tomlinson, III ..................... 359/130 |
| 5,835,517 | 11/1998 | Jayaraman et al. ..................... 372/50 |
| 5,917,625 * | 6/1999 | Ogusu et al. ......................... 359/130 |
| 5,999,672 * | 12/1999 | Hunter et al. ........................... 385/37 |
| 6,011,885 * | 1/2000 | Dempewolf et al. ................... 385/34 |
| 6,088,496 * | 7/2000 | Asghari ................................... 385/37 |

OTHER PUBLICATIONS

Aoyama, K. et al., "Low–Loss Optical Demultiplexer For WDM Systems In The 0.8 μm Wavelength Region" *Applied Optics*, vol. 18, pp. 2407–1417 (1979).

Ishii Y. et al., "Wavelength Demultiplexer In Multimode Fiber That Uses Optimized Holographic Elements", *Applied Optics*, vol. 32, No. 23, pp. 4415–4422 (1993).

Moslehi, et al., "Fiber–Optic Wavelength–Division Multiplexing And Demultiplexing Using Volume Holographic Grating", *Optics Letters*, vol. 14, No. 19, pp. 1088–1090 (Oct. 1989).

Aoyama, K., et al., "Optical Demultiplexer For A Wavelength Division Multiplexing System", *Applied Optics*, vol. 18, No. 8, pp. 1253–1258 (Apr. 15, 1979).

Tomlinson, W.J., "Applications of GRIN–Rod Lenses In Optical Fiber Communication Systems", *Applied Optics*, vol. 19, No. 7, pp. 1127–1138 (Apr. 1, 1980).

Metcalf, B.D., et al., "High–Capacity Wavelength Demultiplexer With A Large–Diameter GRIN Rod Lens", *Applied Optics*, vol. 21, No. 5, pp. 794–796 (Mar. 1, 1982).

Lipson, J., et al., "Low–Loss Wavelength Division Multiplexing (WDM) Devices For Single–Mode Systems", *Journal of Lightwave Technology*, vol. LT–1, No. 2, pp. 387–389 (Jun. 1983).

Winzer, G., "Wavelength Multiplexing Components –A Review Of Single–Mode Devices And Their Applications", *Journal of Lightwave Tachnology*, vol. LT–2, No. 4, pp. 369–378 (Aug. 1984).

Fujii, Y., et al., "Optical Demultiplexer Utilizing An Ebert Mounting Silicon Grating", *Journal of Lightwave Technology*, vol. LT–2, No. 5, pp. 731–734 (Oct. 1984).

Ishio, H., et al., "Review And Status Of Wavelength–Division–Multiplexing Technology And Its Application", *Journal of Lightwave Tachnology*, vol. LT–2, No. 4, pp. 448–463 (Aug. 1984).

Lipson, J., et al., "A Four–Channel Lightwave Subsystem Using Wavelength Division Multiplexing", *IEEE Journal of Lightwave Technology*, vol. LT–3, No. 1, pp. 16–20 (Feb. 1985).

Hillerich, B., et al., "Wide Passband Grating Multiplexer For Multimode Fibers", *Journal of Lightwave Technology*, vol. LT–3, No. 3, pp. 590–594 (Jun. 1985).

Lipson, J., et al., "A Six–Channel Wavelength Multiplexer And Demultiplexer For Single Modoe Systems", *Journal of Lightwave Technology*, vol. LT–3, No. 5, pp. 1159–1163 (Oct. 1985).

Nishi, I., et al. "Broad Passband Multi/Demultiplexer For Multimode Fibers Using A Diffraction Grating And Retroreflectors", *Journal of Lightwave Technology*, vol. LT–5, No. 12, pp. 1695–1700 (Dec. 1987).

Huang, Y., et al., "Wavelength–Division–Multiplexing And – Demultiplexing Using Substrate–Mode Grating Pairs", *Optics Letters*, vol. 17, No. 22, pp. 1629–1631 (Nov. 15, 1992).

Wu, M., et al., "Design Considerations For Rowland Circle Gratings Used In Photonic Integrated Devices For WDM Applications", *Journal of Lightwave Technology*, vol. 12, No. 11, pp. 1939–1942 (Nov. 1994).

Wang, M., et al., "Five–Channel Polymer Waveguide Wavelength Division Demultiplexer for The New Infrared", *IEEE Photonics Technology Letters*, vol. 3, No. 1, pp. 36–38 (Jan. 1991).

* cited by examiner

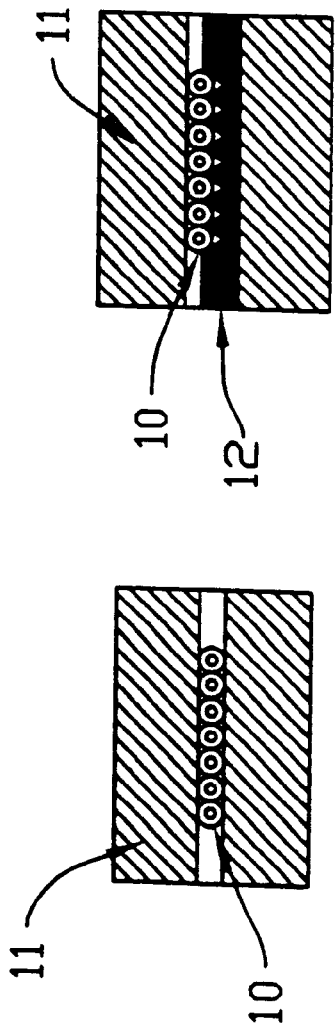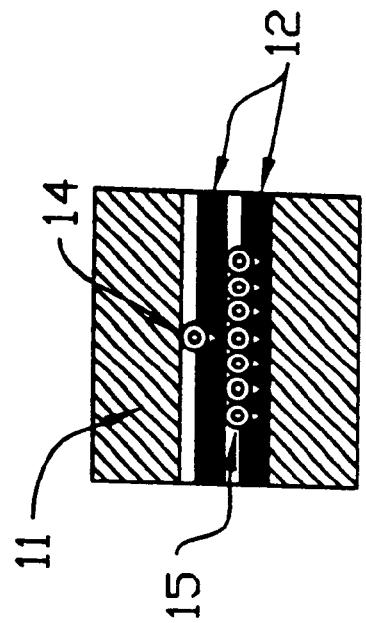

COMPACT DOUBLE-PASS WAVELENGTH MULTIPLEXER-DEMULTIPLEXER

FIELD OF THE INVENTION

This invention generally relates to method and apparatus for optical multiplexers-demultiplexers and, in particular, to high resolution, wavelength selective optical multiplexers-demultiplexers for transmission of information.

BACKGROUND OF THE INVENTION

The explosive growth of telecommunication and computer communications, especially in the area of internet, has placed increasing demand on national and international communication networks. This tremendous amount of worldwide data traffic volume creates a demand for a network having multi-gigabit transmission capacity with highly efficient cross-connect networks. To meet this demand, in the field of fiber optic technology, products have been developed for multi-carrier transmission over a single fiber, which multiplies the amount of capacity over single carrier systems. By assembling several data signals into a multi-channel signal transmitting on a single fiber, commonly referred to as wavelength division-multiplexing ("WDM"), this WDM technology allows multiple users to share a fiber optic link and thereby allowing high throughput over a single link. To assemble the signals, a multiplexing device combines the signals from several sources or channels into a single composite signal. At the receiving end, a demultiplexing device separates the composite wavelength into the several original signals.

There are many specialized applications and variations of the WDM technology. In one variation, dense wavelength division multiplexing ("DWDM") is a WDM device that works for a certain wavelength range and has the ability to handle large number of channels. Some of the critical factors for a DWDM device are high number channels, channel separation, channel spacing, inter-channel cross talk, insertion loss, polarization dependent loss, compactness, environmental stability, and manufacturing cost. To date, wavelength division-multiplexing systems have been unreliable in meeting the aforementioned critical factors,i.e. complete channel separation, low insertion loss, polarization insensitive, etc. Additionally, device size and cost remain high and economically challenging. As a result, there is a need for compact, light weight, low cost devices which can be used as a dense wavelength division multiplexer and demultiplexer compatible with today's fiber optic networks.

There are prior art technologies for making WDM using holographic elements to produce multiplexers and demultiplexers. Despite the fact that prior art technologies provide WDM with highly efficient holographic elements, those devices cannot satisfy the aforementioned critical factors, such as high channel numbers, low cross talk, controlled channel separation and channel spacing. One of the main reasons for the drawbacks in prior art technologies is that, in some cases, there are no optic elements in those devices. Thus it is difficult, if it is not impossible, to correct optical aberrations, such as spherical aberrations, coma, astigmatism, etc. Furthermore, the number of channels provided by these devices are limited because these devices do not provide proper focusing and collimating optics. Rather, they are based on a grating and the arrangement of relative optical fibers with respect to the grating. Also, it is also difficult to reduce cross-talk between adjacent channels due to optical aberrations, which generates beam spots larger than the desirable fiber size, resulting in optical power crossing to other channels in narrow channel spacing situations. For these reasons, these devices are not able to achieve high optical resolution and narrow channel spacing that is critical for DWDM systems.

In another prior art technology, a compact WDM device is provided with spherical grating substrate as a reflective focusing grating. This technology corrects some of the major drawbacks associated with devices without optics. Despite of the fact that the device may provide high spectral resolution, which in turn produce narrow channel spacing, it is not an ideal device. First, the grating is a reflective grating based on surface relief holograms with low diffraction efficiency and thus high insertion loss. Secondly, the grating described in said prior art technology is polarization sensitive, generating intensity variations in the transmitted signals from polarization effects.

Prior art devices having optical elements that are adhered to each other also have high inter-channel cross-talk problems. This is especially the case when glass elements of different refractive indices are used to compensate optical aberrations and the insertion loss from Fresnel (reflection) loss is high. Furthermore, the lost light will be reflected back to the wavelength disperse components either directly or indirectly by the optical element(s) and air. The reflected beam is dispersed by the wavelength disperse components and may be focused, eventually, back to the various components in the system to a position that is different than the expected position. This will result in rather high level of the inter-channel cross-talk. Interestingly, the same drawbacks are also acknowledged in one of the prior art references, U.S. Pat. No. 4,819,224. The required difference in refractive indices to correct the spherical aberration is rather large, causing the chromatic aberration to be rather large and ineffective for industrial applications. Therefore, this type of device cannot satisfy the need for dense wavelength division applications.

Prior art devices are difficult to manufacture. First, some prior art devices involve so-called "locally neutralized" zone that is created on the reflective grating, which is the most critical element of the device. One portion of the grating surface must be treated after the grating is made in order to allow the light to pass. It is difficult to make such a zone without affecting other areas of the grating. Also, this zone causes the grating to lose its integrity and lose significant amount of luminous efficiency. Secondly, some prior art devices involve non-uniform dispersion elements with broad bandwidth, which are not only difficult to manufacture but also may scarify some of the diffraction efficiency. Furthermore, broad bandwidth is practically useless in long-haul telecommunication applications since the erbium-doped self-amplifying optical fibers, which is the enabling technology for wavelength-division and multiplexing in optical networks, only have a limited range of gain spectrum. So broad bandwidth non-uniform grating can only add to manufacturing problems, loss efficiency, resolution and channel separation. Thus, it is not beneficial to DWDM applications. Thirdly, some prior art devices involve off-axis embodiment, which is difficult to align and assemble.

Further drawback of prior art devices is the relative long optical path passing through the many elements. In this type of devices, not only the Fresnel reflection is high. Also, the mechanical and environmental (thermal, stress, etc.) responses of the grating assembly are not monolithic thus not easy to be controlled. They are vulnerable to stress and temperature variations, which may cause inter-channel cross-talk and even variations in channel spacing.

The state-of-the-art wavelength multiplexer/demultiplexer are not suitable for industrial DWDM applications due to the aforementioned major drawbacks, including: manufacturing difficulties, cross-talk, insertion loss, chromatic aberration, luminous efficiency loss, polarization effects, stress and temperature sensitivities, etc. Therefore, there is a need for a DWDM technology to overcome these problems.

SUMMARY OF THE INVENTION

It is therefore an object of the present invention to provide methods and apparatus for DWDM multiplexer-demultiplexer devices that minimize manufacturing difficulties, cross-talk, insertion loss, chromatic aberration, luminous efficiency loss, polarization effects, stress and temperature sensitivities, etc.

It is another object of the present invention to provide methods and apparatus for a multiplexer-demultiplexer device for fiber optic communication networks, in particular, a DWDM systems with high channel numbers, low insertion loss, narrow channel spacing, low inter-channel cross-talk, and low polarization sensitivity.

It is still another object of the present invention to provide methods and apparatus for a DWDM device that is small, lightweight, immune to temperature variation and stress-induced instability, and inexpensive to produce.

It is yet another object of the present invention to provide methods and apparatus for a DWDM device that is easy to manufacture in large quantities, using components that are easy to produce and assemble.

Briefly, the preferred embodiments of the present invention includes a fiber mounting assembly for aligning the optical fibers, a set of collimating and focusing optics, a transmission grating element, and a mirror element. It can be a multiplexing or demultiplexing device.

The fiber mounting assembly aligns a series substantially close-spaced optical fibers with their ends flush and assembled in a substantially straight line. The optical fibers are either multi-mode or single mode communication fibers capable of transmitting optical wavelengths with substantially high transmittance. The operating wavelengths, for example, may be in the vicinity of the wavelengths region around 1540 nm. The number of fibers can essentially be any numbers greater than 3.

Collimating and focusing optics, preferably a lens system that contains one or more elements, may be made from optical glasses with uniform refractive indices, optical glasses with gradient indices, plastic optical elements, or diffractive lenses. All the elements are optimized for the desired communication wavelengths and the surfaces of the elements are anti-reflection coated for the desired wavelength regions to reduce surface reflection and thus enhance efficiency.

The transmission grating element can be made from holographic techniques utilizing photosensitive media, where the media having sufficient thickness to provide high diffractive efficiency and wide operation waveband. The photosensitive media must be able to achieve high spatial resolution in order to generate high groove density—thus high spectral resolution for DWDM applications. The photosensitive media also must be able to transmit the wavelengths of interest. The substrate of the transmission grating is also optimized for the wavelengths of interest.

The mirror element, having a high reflectance coating for the wavelengths of interest, is arranged at such an angle that the optical radiation will be reflected back to the grating, where the beam is diffracted again by the grating then focused to the optical fibers.

An object of the present invention is to provide methods and apparatus for DWDM multiplexer-demultiplexer devices that minimize manufacturing difficulties, cross-talk, insertion loss, chromatic aberration, luminous efficiency loss, polarization effects, stress and temperature sensitivities, etc.

Another object of the present invention is to provide methods and apparatus for a multiplexer-demultiplexer device for fiber optic communication networks, in particular, a DWDM systems with high channel numbers, low insertion loss, narrow channel spacing, low inter-channel cross-talk, and low polarization sensitivity.

Still another object of the present invention is to provide methods and apparatus for a DWDM device that is small, lightweight, immune to temperature variation and stress-induced instability, and inexpensive to produce.

Yet another object of the present invention is to provide methods and apparatus for a DWDM device that is easy to manufacture in large quantities, using components that are easy to produce and assemble.

The invention of the aforementioned multiplexer/demultiplexer has many applications in fiber optic communication networks. Further objects and advantages of the subject invention will be apparent from the following detailed description taken in conjunction with the drawings.

DRAWINGS

FIG. 2 is a diagram showing a prior art fiber assembly.

FIG. 3 is a diagram showing a prior art V-groove fiber assembly.

FIG. 4 is a diagram showing an example of a prior art V-groove fiber assembly.

DETAILED DESCRIPTION OF THE PREFERRED EMBODIMENTS

Figure 1:
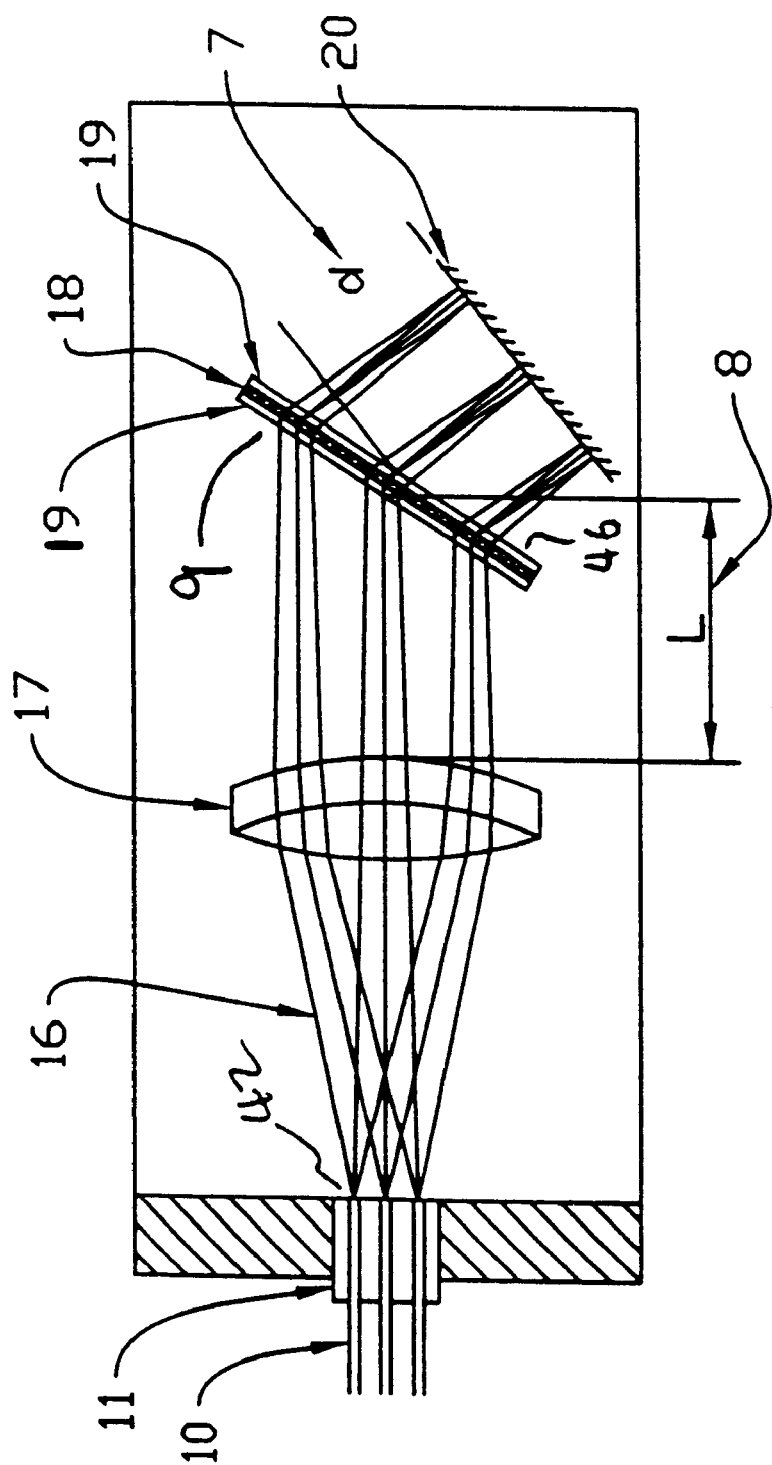
FIG. 1 is a diagram showing the major elements of the preferred embodiment and their interrelationship.

FIG. 1 illustrates the preferred embodiment of the basic multiplexer-demultiplexer apparatus of the present invention. A series of substantially close-spaced optical fiber array 10 are arranged in a mounting assembly 11 with their ends flush. The optical fibers 10 are either multi-mode or single mode communication fibers which are capable of transmitting optical radiation with substantially high transmittance, preferably in the wavelength ranges most suitable for fiber optic networks, meaning wavelength ranges with low loss and high amplification. For example, the wavelength range could be, but not limited to, the vicinity of 1530 nm to 1560 nm band for erbium-doped fiber amplifiers ("EDFAs"). The fibers 10 are arranged substantially close together thus to achieve narrower channel spacing.

The fiber mounting assembly 11 can be made from two precisely polished metal piece as illustrated in FIG. 2, or can be made based on the modern fiber optic communication industry's standard V-groove 12 technology which is illustrated in FIG. 3. It is worthwhile to note that mounting the fibers in such a way has been illustrated in prior art reference, U.S. Pat. No. 4,622,622. FIG. 4 illustrates another preferred alternative way to arrange the fibers where one fiber 14 is arranged side by side with an array of fibers 15.

Referring FIG. 1, the collimating lens system 17 contains one or more elements that may be air spaced or adhered together. The use of a two-element lens would minimize chromatic aberration effect when compared with the use of a one-element lens. Generally speaking, when more elements are used for lens 17, aberration effect can be better minimized. Lens 17 is chosen in such a way that it has sufficient numerical aperture to collect the diverging optical radiation 16 from the fiber assembly. For example, if typical communication fibers with numerical aperture of 0.11 are used, lens 17 should have a minimum numerical aperture of 0.11 in order to collect all the divergent radiation. Lens 17 is optimized to minimize the optical aberrations such as chromatic and spherical aberrations, etc. The surfaces of the lenses should be coated with anti-reflection coating to enhance efficient passage of radiation 16. The back focal point 42 of lens 17 should be arranged near the end of the input fiber in the fiber array 10, in order to achieve collimating for beam 16. After passing the lens 17, the beam is substantial collimated and impinges on the grating assembly 9.

The grating assembly 9 comprises of two parts, the diffractive element 18 and the substrate 19. The substrate 19 is preferably made with low scattering glass material where all the surfaces are preferably coated with anti-reflection coating to enhance the passage of radiation 16. The transmission diffractive element 18 is made by holographic technique utilizing photosensitive media having a sufficient thickness, preferably a volume hologram having a high diffractive efficiency and wide waveband operation. The photosensitive media are preferably materials that are able to achieve high spatial resolution in order to generate high groove density, thus providing high spectral resolution for DWDM applications. Moreover, the photosensitive media are preferably materials that have low scatter, low optical noise and are capable of transmitting the range of wavelengths of interest. One preferred example of such photosensitive medium is dichromate gelatin ("DCG").

Still referring FIG. 1, the distance 8 (labeled "L") between lens 17 and the front surface of substrate 19 is optimized. The distance 8 is preferably sufficiently long to eliminate the possibility of any back reflections from the front surface of the substrate 19 back to the fiber array 10 through lens 17. Note that any back reflection should be small due to the anti-reflection coating. But distance 8 should not be made sufficiently long either so the DWDM device will not be overly large in size. It is important to note that the determination of distance 8 is relative easy once the parameters of the collimating lens and the grating are determined. It can be expressed, in one embodiment, by the following formula:

$$L \geq W * \sin \alpha + (D/2) * \tan(90 - 2\alpha) - \Delta,$$

where W is the width of the grating, $\alpha$ is the grating orientation angle, D is the effective diameter of the collimating lens, $\Delta$ is a correction related to the center and edge thickness of the lens, and L is distance 8.

Depending on the type photosensitive medium used, the grating assembly 9 may be made either from a holographic element 18 on a single substrate 19, or preferably from an environmentally sealed two pieces of substrate 19 which "sandwich" the holographic element 18 in between, if DCG is used. If only a single substrate is used, it can be placed either before or after the diffractive element. The fabrication of DCG holographic elements have been described in many prior art reference, such as: "Dichromate Gelatin for the Fabrication of Holographic Optical Element," prepared by B. J. Chang and C. D. Leonard: Applied Optics, 18, 2407–2417 (1979). The cost of making of the holographic element for the present invention is low since the process is basically a photographic process.

The holographic element 18 is preferably constructed such that it is polarization insensitive. For example, a DCG volume hologram greatly reduces device polarization sensitivity thus greatly reduces signal variations in the transmitted channel.

Figure 5:
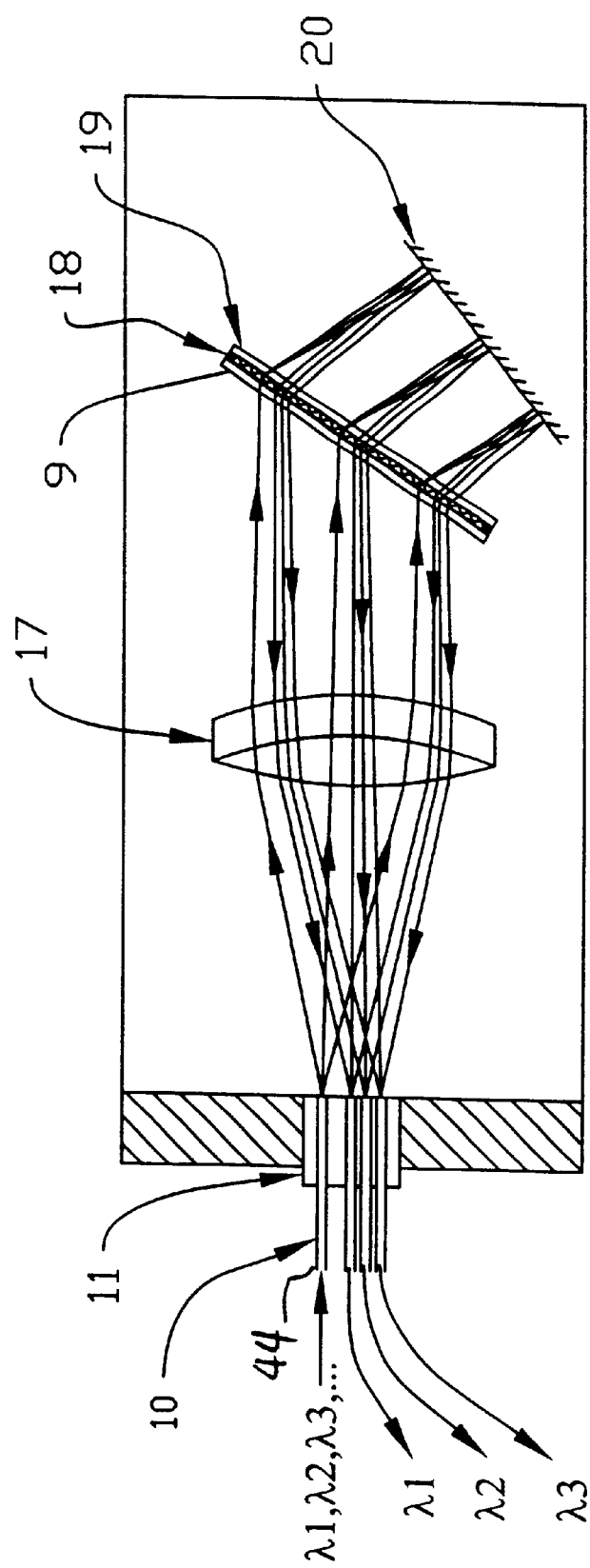
FIG. 5 is a diagram showing an example of a beam path when the subject invention operates as a demultiplexer.

To clearly describe the operation of the preferred embodiment when the device operates as a demultiplexer, a schematic based on one of the aforementioned fiber array, such as array 10, is shown in FIG. 5. An optical beam containing a plurality of wavelengths or channels, such as $\lambda 1, \lambda 2, \lambda 3$ . . . , is transmitted to the device by one single fiber, such as fiber 44 (or any other fiber) in array 10. The device then will separate all the wavelengths or channels, according the wavelengths. The separated beam will be received finally by the other fibers in fiber array 10 as indicated in FIG. 5.

Still referring to FIG. 1 and FIG. 5, the grating assembly 9 is preferably arranged in an angular orientation so that the diffraction efficiency and the first order of diffraction is substantially optimized for the preferred wavelength range. A highly reflective mirror 20 for the preferred wavelength is used to reflect the beams dispersed by the grating assembly 9. Mirror 20 is coated with highly reflective coating, and is mounted in an angular orientation at which the reflected beams by mirror 20 will reverse the beam paths at some preferred angular directions according to their wavelengths, such as $\lambda 1, \lambda 2, \lambda 3$ . . . , etc. The amount of separation between the individual beams is small and depends on the separation of wavelengths or channel spacing. As shown in FIG. 5, assuming the first fiber in array 10 is the input fiber containing the multi-wavelength signal, the beams reflected at these angular directions will be eventually focused into various fibers on the fiber optic array 10 for the respectively wavelengths ($\lambda 1, \lambda 2, \lambda 3, \ldots$).

Another alternative configuration of the orientation of mirror 20 involves the proper tilting the mirror 20 in another dimension by a small angle when a fiber assembly 11 similar to that shown in FIG. 4 is used. The preferred embodiment of the invention uses mirror 20 that is coated with highly reflection coating for the preferred wavelengths.

Referring to FIG. 1, the distance 7 between the back surface 46 of the substrate 19 is also optimized to a particular distance. This distance 7 (labeled "d") is preferably sufficiently long for two reasons. First, it eliminates the possibility of any back reflections from the back surface of the substrate to return back to the fiber array 10, even though any back reflection should be minimal due to the anti-reflection coating. Secondly, it preferably eliminates the possibility of any back reflected (0th order) diffracted light from the mirror 20 back to the fiber array 10 (which pass through the grating following substantially the same path as that of the input beam). This distance 7 should preferably be sufficiently short so that the DWDM device will not be overly large in size. The determination of this distance 7 is relative easy once the parameters of the lens and grating are determined. For the preferred embodiment, it can be expressed by the following formula:

$$d \geq 0.5 * \{(D+M)/\tan(2\alpha) + D \tan \alpha\}$$

where M is the width of the mirror, α is the grating orientation angle, D is the effective diameter of the collimating lens, and d is distance 7.

Referring to the optical system in FIG. 1, the beams are dispersed by the holographic element 18 twice. It is worth to note that the preferred embodiment uses a fiber assembly 11 to arrange the fiber array 10 in a certain spatial spacing that relates to the total linear dispersion ($dl_t/d\lambda$) of the holographic element. The total linear dispersion also relates to the focal length of lens 17 in conjunction with the total angular dispersion of the holographic element 18. The relationship can be described by the following formulas:

$$\text{linear dispersion} \sim dl_t/d\lambda = SS/\Delta\lambda,$$

$$\text{angular dispersion} = 1/f_e * dl_t/d\lambda,$$

where SS is the spatial spacing between the centers of two fibers in fiber array 10; $\Delta\lambda$ is the wavelength spacing or channel spacing; $f_e$ is the effective focal length of lens 17. For example, if fibers are arranged 125 microns apart, to achieve 0.8 nm channel spacing, a holographic element with a total linear dispersion of 0.1563 mm/nm should be designed. Based on a chosen focal length, the total angular dispersion can be calculated so the grating can be designed.

The total numbers of fibers in array 10 is related to the channel spacing and total bandwidth transmitted through the device. It can be expressed as:

$$n = BW/\Delta\lambda,$$

where n is the total number of channels, BW is total bandwidth transmitted through the device; and $\Delta\lambda$ is the wavelength spacing or channel spacing. For example, if a bandwidth of 32 nm is designed to be transmitted through the device, with a 0.4 nm channel spacing, 80 channels are needed. Therefore, 81 fibers should be arranged in the fiber array 10.

Noted that, again referring to FIG. 1, since the beams pass through the holographic element 18 twice and dispersed by it twice, the total dispersion of the device of the preferred embodiment is approximately doubled that of the single pass. With the preferred embodiment, it is easy to produce multiplexer/demultiplexer of high spectral resolution thus high channel numbers with narrow channel spacing. Therefore, a dense multiplexer-demultiplexer device can be readily achieved with this double pass dispersion method.

Describing the beam path after the second pass of the grating, still referring to FIG. 1 and FIG. 5, the diffracted beams of different wavelengths (λ1, λ2, λ3, ...) or channels are focused by lens 17 into various fibers on the fiber optic array 10 by their respective wavelengths.

The whole optical system described in FIG. 1 is highly efficient due to the highly efficient grating assembly and minimal Fresnel loss at all surfaces. Therefore the insertion loss for a DWDM device of the preferred embodiment is low. It is possible to achieve lower than 1.0 dB insertion loss based on the preferred embodiment. Also, due to the optimized spatial separation of elements 17, 9 and 20, a DWDM device of the preferred embodiment has minimum stray light, resulting in low inter-channel cross talk.

Figure 6:
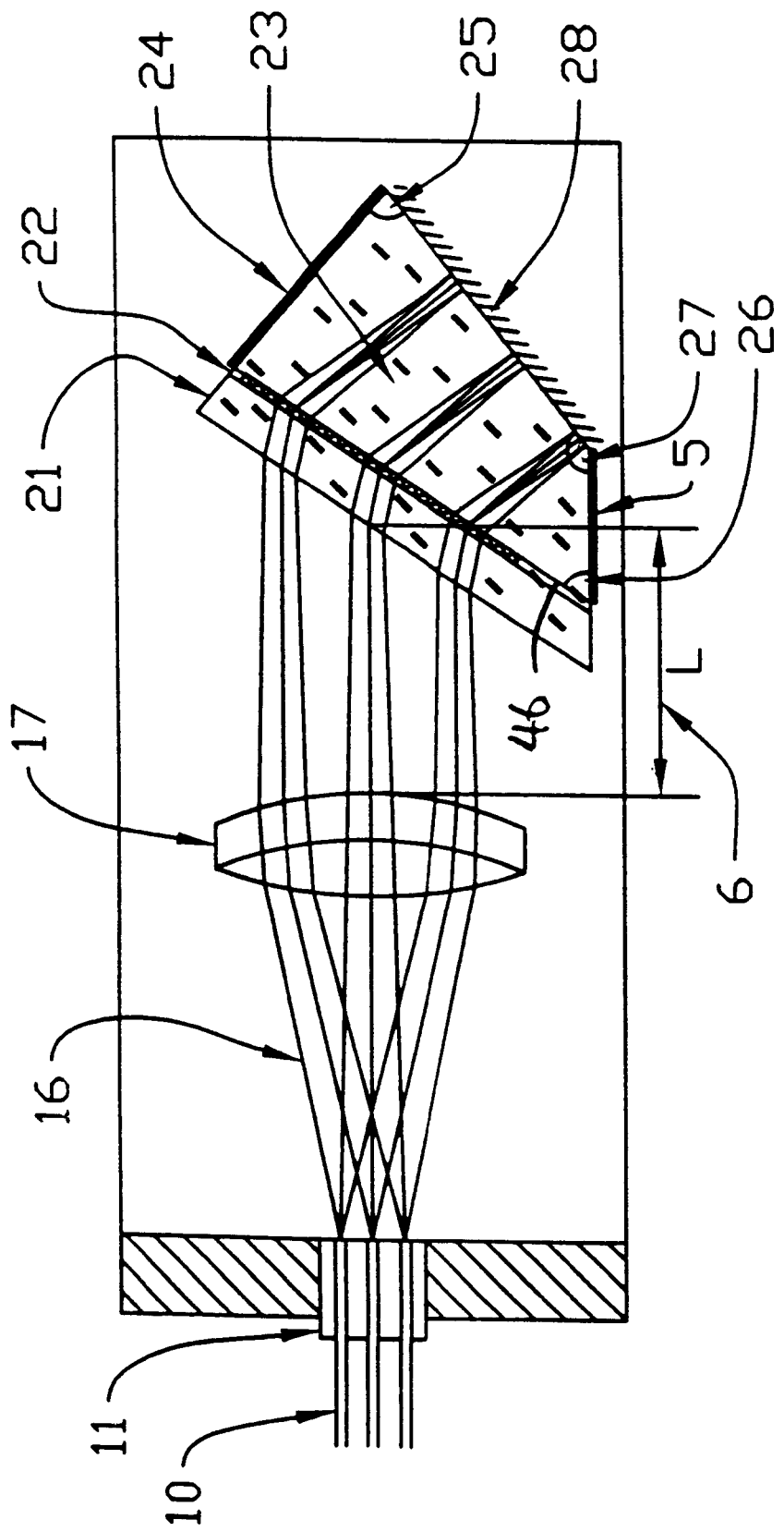
FIG. 6 is a diagram showing an alternative embodiment of the subject invention.

FIG. 6 shows an alternative embodiment of the present invention having integrated optical parts. It comprises of the aforementioned fiber array 10 arranged in a mounting assembly with their ends flush. Again, the optical fibers 10 are either multi-mode or single mode communication fibers. The grating assembly is preferably integrated with the substrate assembly using low scattering glasses of the same refractive index, e.g. substrates 21 and 23 are made from the same type of optical glasses (such as BK7 optical glass). The holographic element 22 is "sandwiched" between substrates 21 and 23 by refractive index matching optical adhesives at the edge regions of the substrates. Moreover, the surfaces of substrate 21 are polished and preferably coated with anti-reflection coating to enhance efficient passage of the radiation. The transmission holographic element 22 has the same characteristics as element 18 shown in FIG. 1, which is made by holographic technique utilizing photosensitive media that having sufficient thickness and preferably a volume DCG hologram.

Still referring to FIG. 6, the front surface 40 of substrate 23 is polished and preferably coated with the same aforementioned anti-reflection coating. Substrates 21 and 23 are attached using refractive index matching optical adhesive. Due to the fact that substrates 21 and 23 have the same refractive index, the Fresnel reflection is eliminated. Thus, a DWDM device based on the alternative embodiment also has minimum stray light, and thus minimizing the inter-channel cross talk. Furthermore, the mechanical and environmental (thermal, stress, et al.) responses of the grating assembly are monolithic and therefore easier to control than devices made of glasses with different refractive indices.

Surface 28, part of the substrate 23, is polished and coated with highly reflective coating, and is cut and polished to an angular orientation at which the beams reflected by surface 28 reverses the beam paths at some preferred angular directions in accordance to their wavelengths.

Furthermore, still referring to FIG. 6, other surfaces 5 and 24 of element 23 are polished and coated with highly absorbing paint for the targeted wavelength ranges in order to absorb any stray radiation. Element 23 is preferably cut with specific corner angles indicated at 25, 26 and 27. These angles are cut in such a way that the possibility of any internal multi-reflections from the side surfaces (24 and 5) returning back to the fiber array 10 is substantially reduced, again minimizing inter-channel cross talk. The thickness of element 23 and the distance 6 between the lens 17 and the front surface 40 of the substrate 23 are preferably determined based on the same aforementioned formula.

Figure 7:
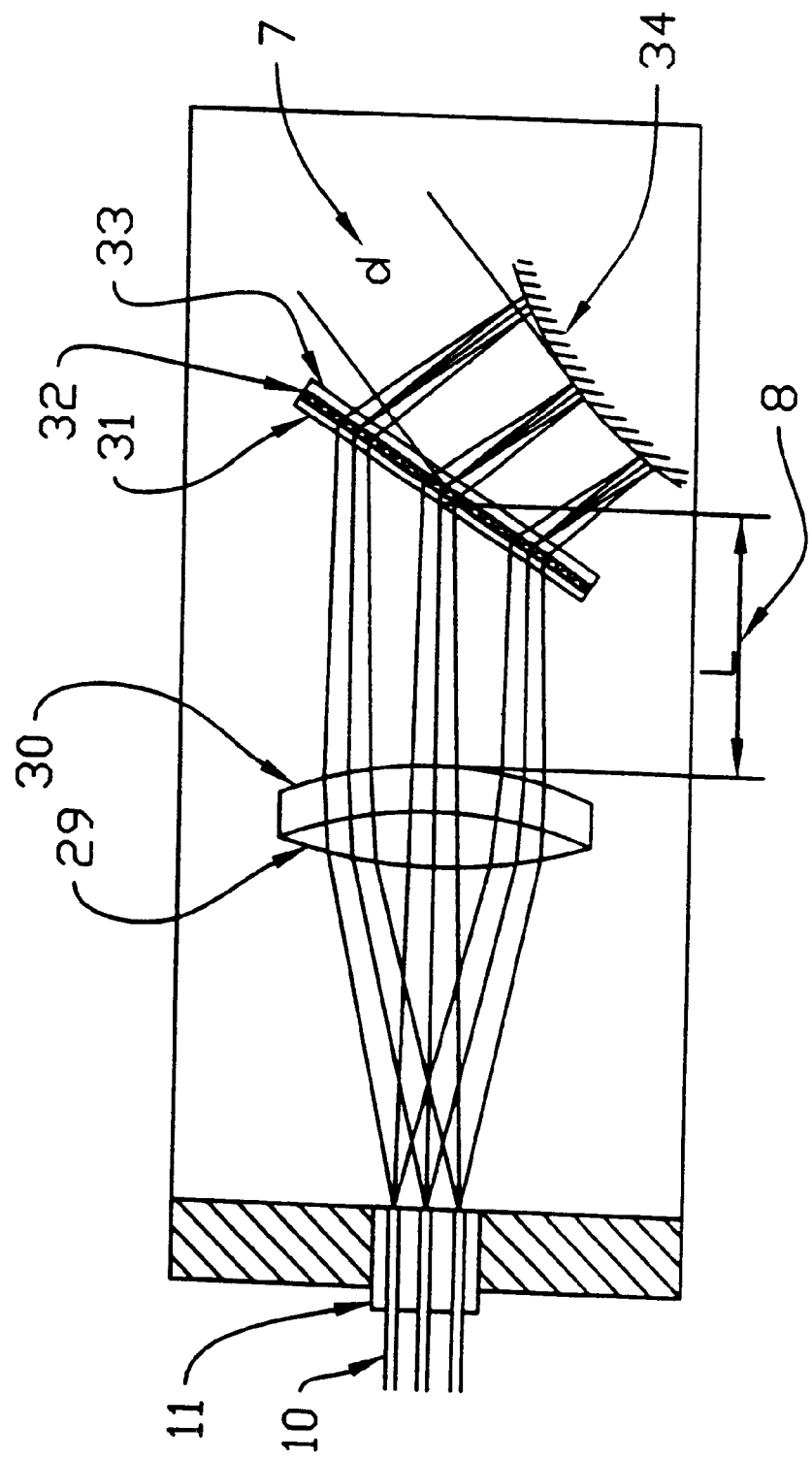
FIG. 7 is a diagram showing another alternative embodiment of the subject invention.

FIG. 7 shows another alternative embodiment of an optical system. Similarly, it comprises of aforementioned fiber array 10, which are either multi-mode or single mode communication fibers. The grating assembly is otherwise the same as grating assembly 9 shown in FIG. 1 except that substrates 31 and 33 are made differently.

Here, substrates 31 and 33 are made from low scattering glass having a predetermined optical power, i.e., instead flat surfaces, either or both surfaces of substrates 31 and 33 are made to have radii of curvatures. Or, they can be made from special glasses such as gradient index glass, or the both. Moreover, the mirror 34 is again coated with highly reflective coating and is made to a spherical (or aspherical) shape for correcting optical aberrations in conjunction with the lens configurations. Note that FIG. 7 shows a convex shaped mirror; the preferred embodiment is not restricted to either concave or convex shapes. The shape of the mirror is determined by optimization of the optical components to minimize system optical aberrations, which can be readily achieved by using commercially available optical design software such as Code V® or Zemax®, etc.

Note that aspherical optical surfaces was difficult to fabricate. However, recent developments in optics manufacturing technologies, such as diamond turning techniques, have simplified and made routine the fabrications of aspherical mirrors.

By properly using this alternative embodiment, optical systems having high resolution, thus narrower channel spacing, can be easily achieved when compare to prior art technologies using index variation for compensating optical aberrations. Therefore, device based on this alternative embodiment can satisfy the need for DWDM applications.

Figure 8:
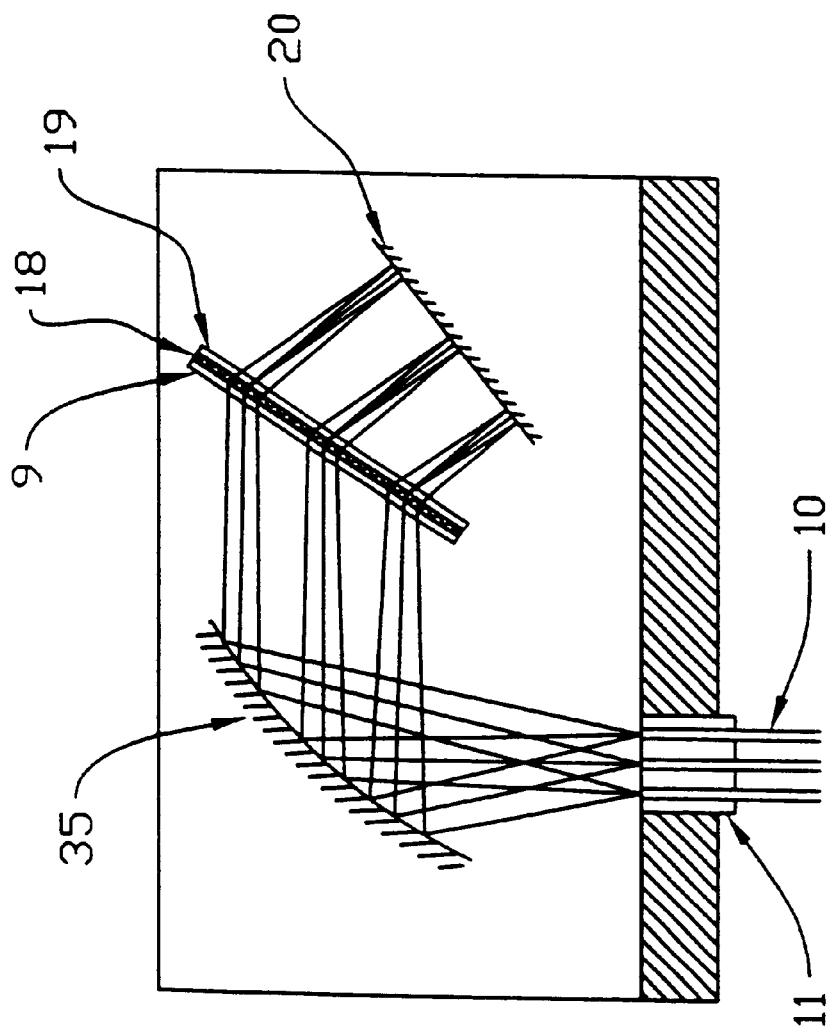
FIG. 8 is a diagram showing yet another alternative embodiment of the subject invention.

FIG. 8 shows yet another alternative embodiment. The components are otherwise similar to those of FIG. 1 except that an off-axis parabolic mirror 35 is used to replace the focusing/collimating lens. The surface of the mirror 35 is preferably parabolic shaped but it can be any other suitable shapes that produce the desired collimating/focusing function. For example, it can be a concave mirror. Parabolic mirror 35 is polished and preferably coated with anti-reflection coating to enhance the high reflectance of the aforementioned radiation range. Note that this alternative embodiment has the advantage of having less chromatic aberration generated from the off-axis parabolic mirror 35 when compare to that of the focusing lens 17.

Figure 9:
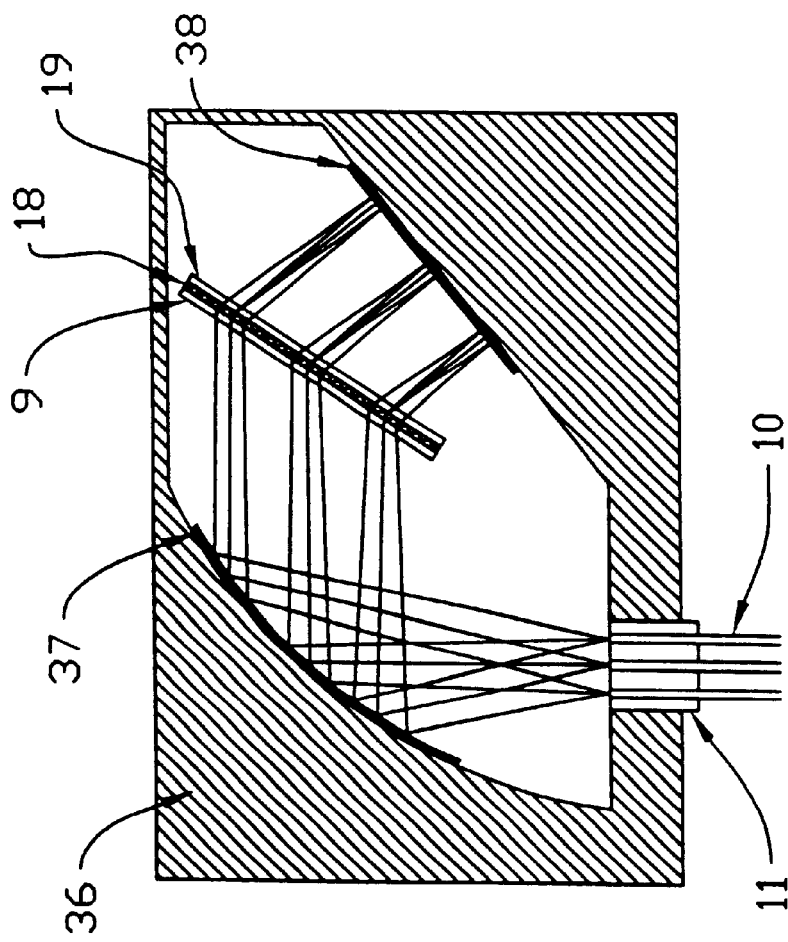
FIG. 9 is a diagram showing still another alternative embodiment of the subject invention.

FIG. 9 shows still another alternative embodiment similar to the system shown in FIG. 8 except that the device is machined from a single piece of low thermal expansion material, such as low expansion metal, plastic, glass or ceramic materials. The components are part of the device body. For example, the body 36 can be machined from a single piece of low expansion metal, Invar. As shown in FIG. 9, the collimating and focusing element is machined as part of the body 36, i.e. surface 37 is machined and polished into an off-axis parabolic shape or any other suitable shapes that produce the desired collimating/focusing function. For example, it can be a concave mirror. Likewise, surface 38 is also machined as part of the body 36, and polished to a mirror. Surfaces 37 and 38 are coated with highly reflective coating in the high reflectance of the aforementioned radiation range. Note that this alternative embodiment has the advantage of having the optical components machined on a single body, so it not only rugged but also has monolithic response to stress, temperature variations. Furthermore, alignment of such system is easier.

In operation, when the embodiments of the present invention operates as a demultiplexer, an optical beam containing a plurality of wavelengths to be diverged is transmitted to the device by a pre-designated optical fiber. The divergence of the beam depends on the numerical aperture of the input fiber whose end is located at the vicinity of the focal point of the collimating lens which has sufficient numerical aperture to accept the diverging beam from the optical fiber. The beam thus is substantially collimated by the lens and then impinged on the holographic element. The individual wavelengths within the beam are diffracted and angularly separated by the holographic element according to their wavelengths. The spatially separated beams will be redirected by the highly reflective mirror back to the holographic element which makes further spatial separation of the individual wavelengths, thus enhance the total dispersion of the grating element. The spatially dispersed beams are focused by the aforementioned focusing lens system and received directly by a series of optical fibers.

When the embodiments of the present invention operates as a multiplexer, the aforementioned beam path is reversed and the beam would be propagating in the reversed directions when compared to the demultiplexer mode. The device operates in such a way where all the different wavelengths from the series of optical fibers are collected by the lens, diffracted by the holographic element with specific angular orientations according to the individual wavelengths. The diffracted beams are then reflected by the mirror, diffracted again by the holographic element and combined into a series of substantially collimated beams regardless of their wavelengths. These beams are essentially one beam that contains all the wavelengths and is received by one optical fiber.

In summary, the present invention has remedied and overcame the drawbacks of prior art technologies and provides an improved DVDM method and apparatus. The invention provides a multiplexer-demultiplexer device for fiber optic communication networks, in particular, a DWDM system with low insertion loss, low inter-channel cross-talk, and low polarization sensitivity. The device is small, lightweight, immune to temperature variation and stress-induced instability, and inexpensive to produce.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

We claim:

1. An optical multiplexing and demultiplexing device, comprising:
   a fiber mounting assembly for securing a plurality of optical fibers, each terminating in a fiber end for radiating and receiving associated light beams;
   reflecting means for reflecting beams radiating from said fiber ends;
   a collimating and focusing lens for collimating and focusing beams propagating between said fiber ends and said reflecting means; and
   a transmissive grating for diffracting beams propagating between said lens and said reflecting means, said grating including a diffractive element formed from a photosensitive medium, and being disposed at a distance from said lens, wherein said distance is optimized in order to substantially eliminate reflection of beams incident on said grating back toward said optical fibers, wherein said grating has a width and is disposed at a predetermined orientation angle relative to said lens, wherein said lens has an effective diameter, and wherein said distance between said lens and said grating is optimized in accordance with a relationship that is determined based at least in part on said width, said orientation angle, and said effective diameter.

2. A device as recited in claim 1 wherein said collimating and focusing lens comprises a plurality of elements.

3. A device as recited in claim 1 wherein said photosensitive medium is a volume hologram.

4. A device as recited in claim 3 wherein said grating further includes a first substrate and a second substrate, and wherein said diffractive element is disposed between said first substrate and said second substrate.

5. A device as recited in claim 4 wherein at least one of said first and second substrates is made from low scattering glass.

6. A device as recited in claim 5 wherein at least one of said first and second substrates is coated with an anti-reflection coating.

7. A device as recited in claim 4 wherein said second substrate and said reflecting means comprise a single integrated unit.

8. A device as recited in claim 3 wherein said photosensitive medium comprises photo-polymer material.

9. A device as recited in claim 8 wherein said photosensitive medium comprises dichromate gelatin.

10. A device as recited in claim 9 wherein said second substrate and said mirror comprise a single integrated unit.

11. A device as recited in claim 1 wherein said distance between said lens and said grating is measured between a center point of said grating and a center point of said lens, said distance being determined in accordance with a relationship expressed as, $$L \geq W^*\sin\alpha + (D/2)^*\tan(90-2\alpha) - \Delta,$$

wherein L represents said distance between said lens and said grating, W represents said width of said grating, α represents said grating orientation angle, D represents said effective diameter of said lens, and Δ is a correction factor determined as a function of the thickness of said lens at said center of said lens and at the periphery of said lens.

12. A device as recited in claim 11 wherein said grating is disposed at a second distance from said reflecting means, said second distance also being optimized in order to substantially eliminate reflection of beams from said grating and said reflecting means back toward said optical fibers.

13. A device as recited in claim 12 wherein said reflecting means includes a mirror having a surface and a width, and wherein second distance is measured between a center point of said grating and said surface of said mirror, said second distance being determined in accordance with a relationship expressed as, $$d \geq 0.5^*\{(D+M)/\tan(2\alpha) + D\tan\alpha\},$$

wherein d represents said second distance, M represents said width of said mirror, α represents said grating orientation angle, and D represents said effective diameter of said lens.

14. A device as recited in claim 1 wherein said grating is disposed at a second distance from said reflecting means, said second distance also being optimized in order to substantially eliminate reflection of beams from said grating and said reflecting means back toward said optical fibers.

15. A monolithically formed optical multiplexing and demultiplexing device, comprising:

a body having a chamber formed therein, said chamber having walls;

a fiber mounting assembly for securing a plurality of optical fibers, said fiber mounting assembly being fixed within a port formed through said walls of said chamber;

a first reflecting surface for collimating and focusing one or more beams from said plurality of optical fibers, said first reflecting surface being formed on a first wall of said chamber;

a transmissive grating including a diffractive element formed from a photosensitive medium, said transmissive grating being formed within said chamber; and a second reflecting surface for receiving one or more beams reflected by said first reflecting surface and passed transmissively through said grating, and reflecting said one or more beams back transmissively through said grating and said first reflecting surface to one or more of said plurality of optical fibers, said second reflecting surface being formed on a second wall of said chamber, wherein said grating is disposed at a distance from said second reflecting surface, said distance being optimized in order to substantially eliminate reflection of beams from said grating and said second reflecting surface back toward said optical fibers, wherein said second reflecting surface includes a mirror having a surface and a width, wherein said grating has a width and is disposed at a predetermined orientation angle relative to said first reflecting surface, wherein said first reflecting surface has an effective diameter, and wherein said distance is measured between a center point of said grating and said surface of said mirror, said distance being determined in accordance with a relationship expressed as, $$d \geq 0.5^*\{(D+M)/\tan(2\alpha) + D\tan\alpha\},$$

wherein d represents said distance, M represents said width of said mirror, α represents said grating orientation angle, and D represents said effective diameter of said first reflecting surface.

16. A device as recited in claim 15 wherein said first reflecting surface comprises a concave surface.

17. A device as recited in claim 15 wherein said first reflecting surface comprises an off-axis parabolic surface.

18. A device as recited in claim 15 wherein said device is encapsulated within an integral housing.

19. A device as recited in claim 18 wherein said first reflecting surface and said second reflecting surface comprise said integral housing.

20. A device as recited in claim 15 wherein said photosensitive medium comprises a volume hologram.

21. A device as recited in claim 15 wherein said grating further includes a first substrate and a second substrate, and wherein said diffractive element is disposed between said first and second substrates.

22. A device as recited in claim 21 wherein at least one of said first and second substrates is made from low scattering glass.

23. A device as recited in claim 22 wherein at least one of said first and second substrates is coated with an anti-reflection coating.

24. A device as recited in claim 15 wherein said photosensitive medium comprises photo-polymer material.

25. A device as recited in claim 15 wherein said photosensitive medium comprises dichromate gelatin.

26. An optical multiplexing and demultiplexing device, comprising:

a fiber mounting assembly for securing a plurality of optical fibers, each terminating in a fiber end for radiating and receiving associated light beams;

reflecting means for reflecting beams radiating from said fiber ends;

a collimating and focusing lens for collimating and focusing beams propagating between said fiber ends and said reflecting means; and a transmissive grating for diffracting beams propagating between said lens and said reflecting means, said grating including a diffractive element formed from a photosensitive medium, and being disposed at a first distance from said lens, wherein said first distance is optimized in order to substantially eliminate reflection of beams incident on said grating back toward said optical fibers, wherein said grating is disposed at a second distance from said reflecting means, wherein said grating has a width and is disposed at a predetermined orientation angle relative to said lens, wherein said lens has an effective diameter, said second distance also being optimized in order to substantially eliminate reflection of beams from said grating and said reflecting means back toward said optical fibers, wherein said reflecting means includes a mirror having a surface and a width, and wherein second distance is measured between a center point of said grating and said surface of said mirror, said second distance being determined in accordance with a relationship expressed as, $$d \geq 0.5 * \{(D+M)/\tan(2\alpha) + D \tan \alpha\},$$

wherein d represents said second distance, M represents said width of said mirror, α represents said grating orientation angle, and D represents said effective diameter of said lens.

27. An optical multiplexing and demultiplexing device, comprising:

- a fiber mounting assembly for securing a plurality of optical fibers, each terminating in a fiber end for radiating and receiving associated light beams;
- reflecting means for reflecting beams radiating from said fiber ends;
- a collimating and focusing lens for collimating and focusing beams propagating between said fiber ends and said reflecting means; and
- a transmissive grating for diffracting beams propagating between said lens and said reflecting means, said grating including a diffractive element formed from a photosensitive medium, and being disposed at a first distance from said lens, wherein said first distance is optimized in order to substantially eliminate reflection of beams incident on said grating back toward said optical fibers, wherein said grating is disposed at a second distance from said reflecting means, wherein said grating has a width and is disposed at a predetermined orientation angle relative to said lens, wherein said lens has an effective diameter, said second distance also being optimized in order to substantially eliminate reflection of beams from said grating and said reflecting means back toward said optical fibers, wherein said reflecting means includes a convex shaped mirror having a surface and a width, and wherein said second distance is measured between a center point of said grating and a center point of said surface of said convex shaped mirror, said second distance being determined in accordance with a relationship expressed as, $$d \geq 0.5 * \{(D+M)/\tan(2\alpha) + D \tan \alpha\},$$

wherein d represents said second distance, M represents said width of said mirror, α represents said grating orientation angle, and D represents said effective diameter of said lens.

* * * * *